Oct. 17, 1950  L. FEINSTEIN ET AL  2,525,785
PROCESS FOR EXTRACTING ALKALOIDALS FROM PLANTS WITH
AQUEOUS AMMONIA-ETHYLENE DICHLORIDE MIXTURE
Filed Dec. 5, 1949
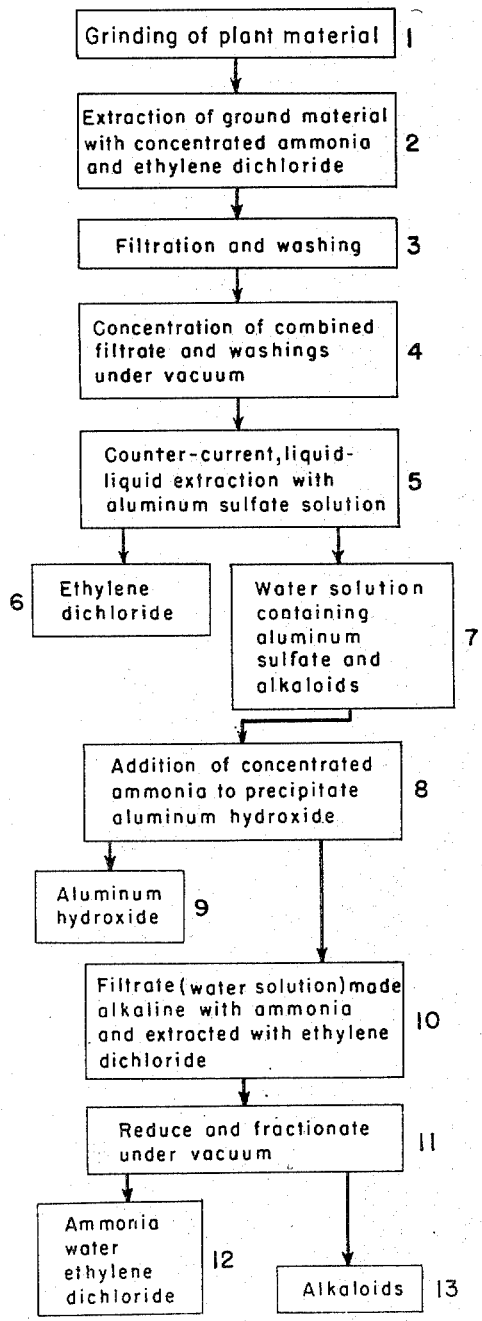
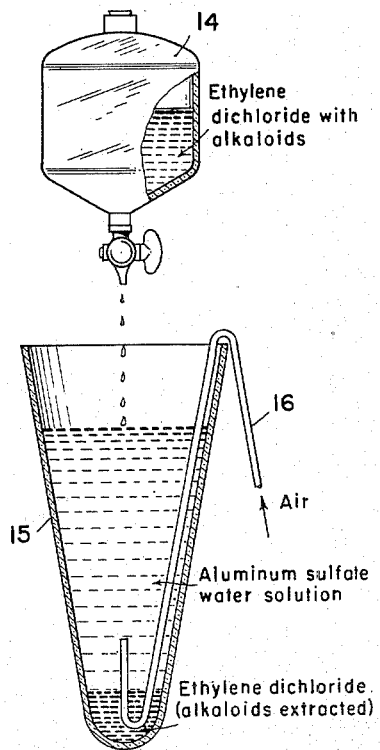
INVENTORS
L. FEINSTEIN
P. J. HANNAN
BY
L. M. Mantell
ATTORNEY Patented Oct. 17, 1950

2,525,785

UNITED STATES PATENT OFFICE 2,525,785

PROCESS FOR EXTRACTING ALKALOIDALS FROM PLANTS WITH AQUEOUS AMMONIA-ETHYLENE DICHLORIDE MIXTURE

Louis Feinstein, Hyattsville, Md., and Patrick J. Hannan, Washington, D. C., dedicated to the free use of the People in the territory of the United States Application December 5, 1949, Serial No. 131,162

5 Claims. (Cl. 260—291)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

We hereby dedicate the invention herein described to the free use of the people in the territory of the United States to take effect on the granting of a patent to us.

This invention relates to a process for extracting the alkaloidal content of plant materials, especially the alkaloids of species belonging to the Solanaceae and Chenopodiaceae families.

An object of this invention is to obtain pure alkaloids free of coloring bodies and chlorophyll; organic and inorganic salts; fats, esters and fatty acids; carbohydrates and sugars; resins and glucosides; and other non-alkaloidal plant matters.

A further object of this invention is to extract the alkaloidal content of Nicotiana species of the Solanaceae family, such as anabasine, nicotine, and nornicotine, in a form free from non-alkaloidal plant matters.

In one aspect, the process involves extracting the alkaloids from solution in a water-immiscible inert organic solvent, such as halogen hydrocarbons, by contacting this solution with an aqueous solution of aluminum sulfate, precipitating the aluminum as aluminum hydroxide with a volatile base, such as ammonia, removing the aluminum hydroxide, extracting the ammoniacal aqueous solution with organic solvent, and distilling off the ammonia and the organic solvent.

The said solution of the alkaloids in a water-immiscible organic solvent is obtained, in one embodiment of the process, by extracting plant material with a mixture of organic solvent and concentrated aqueous ammonia, or other concentrated aqueous volatile nitrogen base, to free the alkaloids from combination with plant acids. The organic solvent is preferably one in which the free alkaloid is highly soluble and which is inert to all the components and is immiscible, or only slightly soluble, in water.

One embodiment of the process is illustrated in the drawings, in which:

Figure 1 is a flow-diagram of the steps of the process;

Figure 2 illustrates a laboratory liquid-liquid extractor that can be used in place of industrial or full scale plant counter-current, liquid-liquid extractors.

In accordance with this invention the plant materials, leaves, twigs, stems, branches and roots, are thoroughly ground in machines known as wood hogs. These machines are set to give a fine sawdust product suitable for thorough extraction with solvents. The solvent mixture used is ammonia and ethylene dichloride. We prefer to use concentrated aqua ammonia containing approximately 30% ammonia so that only a small amount of water is used in the extraction. This small amount of water, however, helps the ammonia to penetrate the cell walls and by expanding the cell breaks the wall.

The concentrated ammonia and organic halogenhydrocarbon, such as ethylene dichloride (1,2-dichlorethane) extracts the alkaloids with minimum water content in the extracting fluid. This step limits the contaminants of the alkaloids to a relatively small amount of the initial plant matter soluble in ammoniacal halogenhydrocarbon. Proteins, amino-acids and carbohydrates will mainly fail to be extracted with the alkaloids. The ethylene dichloride enters and extracts the free alkaloids which the ammonia liberated from the plant acids by exchange. The ammonia forms ammonium salts of the plant acids and the alkaloids are no longer bound as alkaloid salts. The ethylene dichloride can extract the alkaloids in the free state only. The quantities of each can be varied but we prefer to use, for each kilogram of ground plant material, 400 milliliters of 30% aqua ammonia and 4000 milliliters of ethylene dichloride. The exact length of time needed for extraction must be found experimentally for each plant material.

The ground plant material, having been thoroughly mixed with ammonia and ethylene dichloride, is allowed to stand twenty-four hours or longer to insure complete penetration of the mixed solvent into the cells. The tank holding the plant materials and solvents must have a cover to prevent loss of ammonia and ethylene dichloride to the atmosphere during the extraction time. Enough of the ammonia and ethylene dichloride solvent mixture should be added to the tank so that there is a liquid layer above the solvent saturated plant material in the tank. A wide temperature range can be employed. It is convenient to operate between room temperature and the boiling point of ethylene dichloride.

At the completion of the extraction the solvent is separated from the extracted plant material. This can be done by simple filtration on a filter pad, by cylinder filters, or filtration by a series of filter pads in a filter press. Additional ethylene dichloride is used to wash the plant material free of the original extraction solvent mixture. When the washings are colorless, the filtrate and washings are combined as one. The solvent is removed under vacuum distillation, for example, at 35° C. under a vacuum of 75–80 mm., until a volume remains in the still equivalent to 200 milliliters per kilogram of plant material extracted.

The concentrated extract left in the still after vacuum distillation of the ammonia and the greater part of the ethylene dichloride is run counter-current with a water solution of aluminum sulfate. The use of aluminum sulfate in water solution to remove the alkaloids from the halogenhydrocarbon removes additional contaminants, the fats, oils, chlorophyll, which are not water soluble. These contaminants remain in the organic solvent. Counter-current, liquid-liquid extraction is used because very stable emulsions form when other procedures are used to remove the free alkaloids from the concentrated extract. For example, attempts to extract the ethylene dichloride alkaloid concentrate with aqueous aluminum sulfate by shaking in a separatory funnel resulted in an emulsion that was stable for days. For best results, the aluminum sulfate solution volume should be approximately six to seven times the volume of concentrated extract, or approximately a water volume of 1300 milliliters per kilogram of original plant material. The amount of aluminum sulfate present should be in excess of that needed to hold the alkaloids present. We prefer having an excess of at least 100%. Extraction at room temperature is adequate.

A packed, baffle plate, bubble cup, or sieve plate column can be used as counter-current extraction. The heavier liquid, here the ethylene dichloride concentrated extract, is passed downwardly; the lighter liquid, the aqueous aluminum sulfate, flows upwardly.

A preferred form of counter-current extraction is similar to that known as the "Podbielniak Solvent Extractor."

In the centrifugal solvent extractor, for example, that described in Podbielniak patents, the lighter of the two immiscible liquids, the aqueous aluminum sulfate, is pumped to the outside of a spinning rotor. Simultaneously, the heavier liquid, the ethylene dichloride, is pumped into the center of the rotor. Because of the density difference, the aqueous solution is displaced by the heavier and is made to flow towards the center of the rotor. The two liquids pass counter-currently to each other through contacting elements arranged to effect a series of intimate mixings and separations of the two liquids under influence of centrifugal force. The proportion of ethylene dichloride to aqueous aluminum sulfate is easily regulated as indicated above.

On a laboratory scale, the extractor shown in Figure 2, is satisfactory. The ethylene dichloride, in vessel 14, containing the alkaloids in solution, being heavier, drops down slowly to the bottom, through the aqueous aluminum sulfate solution in 15. The aluminum sulfate solution is in great excess. The lighter aqueous solution is displaced upwardly. Air introduced through pipe 16 stirs the aqueous solution continuously. The great excess of aqueous solution obviates troublesome formation of a stable emulsion.

When the liquid-liquid extraction is complete all the alkaloids are found as alkaloid salts in the aluminum sulfate solution. The water extract now containing the alkaloids is reacted with ammonia to form aluminum hydroxide. Enough ammonia is added to bring the pH to 8. The precipitated aluminum hydroxide is filtered off, and the filtrate then made more alkaline with ammonia to free the alkaloids.

By removing the aluminum as the hydroxide, the precipitating aluminum hydroxide removes additional contaminants. Alkaloids, such as anabasine, nicotine, and nornicotine, are not absorbed by the precipitate.

In the free state the alkaloids can be extracted from the water solution with ethylene dichloride. To do this we make a counter-current, liquid-liquid extraction. The purpose here is to remove the free alkaloids from the water filtrate with ethylene dichloride. Room temperature is sufficient. Counter-current extraction at this stage is not vital because stable emulsions do not form readily at this part of the procedure. Therefore, any method of mixing the two-liquids, the water filtrate and the ethylene dichloride, can be used here.

This additional extraction of the alkaloid from the water phase by ammonia and halogenhydrocarbon results in purifying the alkaloids again. Many coloring bodies are left behind in the water phase while the alkaloids go into the organic solvent phase.

The new solvent extract is then reduced in volume under vacuum. The free ammonia, ethylene dichloride, and water present distill over first. The free alkaloids distill over also as the temperature is raised. The free alkaloids can be distilled over in a single fraction or, if a mixture of alkaloids is present, various fractions can be made of the distillate during the vacuum distillation. Distillation up to 200° C. with a vacuum of 4 mm. is satisfactory.

The process described above applied to the plant *Nicotiana glauca* resulted in the production of the alkaloid anabasine and applied to the plants *Nicotiana ripanda* and *Nicotiana tabacum* resulted in nicotine alkaloids respectively.

Having thus described our invention, we claim:

1. A process for obtaining alkaloidal substances from plant material, comprising: extracting the plant material with concentrated aqueous ammonia and ethylene dichloride, distilling the extract to remove the ammonia and to remove part of the ethylene dichloride to form a concentrated extract, contacting the concentrated extract with aqueous aluminum sulfate, the latter being present in greater volume than the concentrated extract during said contacting, adding ammonia to the aqueous extract to bring the pH to about 8 to precipitate aluminum hydroxide, removing the aluminum hydroxide, adding more ammonia to free the alkaloids, extracting the alkaloids from the aqueous extract with ethylene dichloride, and removing the ammonia and ethylene dichloride.

2. In a process of obtaining the alkaloids from a plant of the Nicotiana species of the Solanaceae family, the improvement comprising contacting a solution of the free alkaloids in ethylene dichloride with aqueous aluminum sulfate, precipitating the aluminum as aluminum hydroxide by adding ammonia, separating the precipitate, and contacting the ammoniacal aqueous extract with ethylene dichloride to extract the alkaloid.

3. In a process of extracting alkaloids from solution of the free alkaloids in a water-immiscible, inert, organic solvent, the improvement comprising using as extractant an aqueous solution of aluminum sulfate.

4. In a process of extracting alkaloids from a solution of the free alkaloids in a water-immiscible, inert, organic solvent, the improvement comprising using as extractant an aqueous solution of aluminum sulfate, and precipitating the aluminum as aluminum hydroxide.

5. In a process of extracting alkaloids from a solution of the free alkaloids in a water-immiscible, inert, organic solvent, the improvement comprising using as extractant an aqueous solution of aluminum sulfate, and precipitating the aluminum as aluminum hydroxide with ammonia, extracting the ammoniacal aqueous solution with an organic solvent, and distilling off the ammonia.

LOUIS FEINSTEIN.
PATRICK J. HANNAN.

REFERENCES CITED

The following references are of record in the file of this patent:

UNITED STATES PATENTS

| Number | Name | Date |
| --- | --- | --- |
| 1,447,400 | Stoll | Mar. 6, 1923 |
| 1,947,330 | Casparis et al. | Feb. 13, 1934 |
| 2,162,738 | McCoy | June 20, 1939 |

FOREIGN PATENTS

| Number | Country | Date |
| --- | --- | --- |
| 145,622 | Great Britain | May 5, 1921 |
| 102,143 | Switzerland | Dec. 17, 1933 |